J. J. COBURN.
Friction Clutch Mechanism.

No. 138,075. Patented April 22, 1873.

Witness.  Inventor.
F. V. Holt  John J. Coburn
Hugh B. Coyle

UNITED STATES PATENT OFFICE.

JOHN J. COBURN, OF PHILADELPHIA, PENNSYLVANIA, ASSIGNOR OF ONE-HALF HIS RIGHT TO HUGH B. COYLE.

IMPROVEMENT IN FRICTION-CLUTCH MECHANISMS.

Specification forming part of Letters Patent No. 138,075, dated April 22, 1873; application filed March 22, 1873.

*To all whom it may concern:*

Be it known that I, JOHN J. COBURN, of the city and county of Philadelphia, State of Pennsylvania, have invented an Improved Mode of Constructing Friction-Clutches, of which the following is a specification:

My invention consists in means for preventing wear of frictional surfaces of parts composing the friction-clutch mechanism, consisting of a cup-shaped piece of metal, shown at M, provided with a hub, G, made to fit the shaft F, to which it is secured by means of a spline and a set-screw, O, the latter passing through the collar of the cup. A similarly-constructed disk, A, of metal, upon the inner surface of which is the raised projection B, the periphery shaped in the form of three curved inclines, as shown at C. The cup and disk are then fitted together, the raised projection being inclosed by the flange upon the cup, and capable of being easily turned within it, the disk being free to revolve around the shaft. I now place small rollers D within the deepest part of the cam-shaped inclines, the diameter of the rollers being such that when the disk is turned on the shaft in one direction they will present no obstruction; but if moved in the opposite direction, they will be carried further along the incline plane, and, consequently bind the disk to the cup, whereby any motion given to the disk-plate will be imparted to the shaft to which the cup is attached. In order to prevent the wear of the surface upon which the rollers revolve, I insert steel shoes C for the wearing-surface, which are inserted into a circular cavity below the shoulders, against which the rollers abut. The advantages of said shoes are, first, that the cup cannot be injured by friction, and as the shoes wear they can be easily replaced by new ones; the other advantage is that the rollers will not bind as much as they would without the shoe. The shoulder against which the rollers abut has a perforation, into which I insert a metallic or rubber spring, E. The shaft has a groove on its exterior, within which passes the spline N, for the purpose of connecting it firmly with the disk A. Said shaft is on each end squared out hollow for the reception of the drill-tool, which is secured by a screw or similar fastening.

Figure 1:
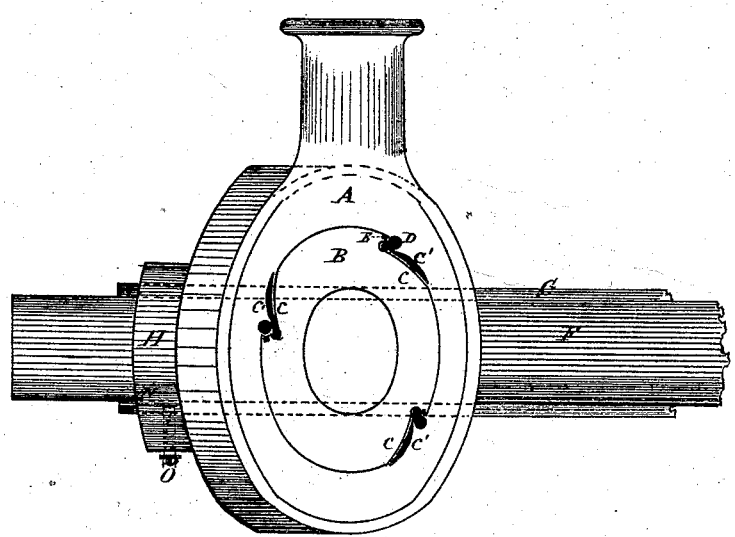
Figure 2:
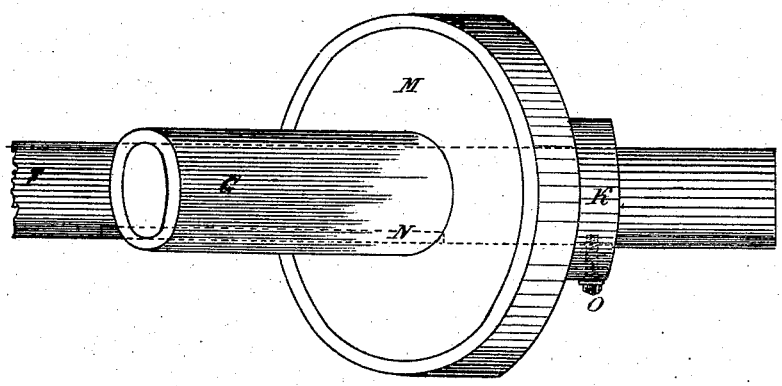

Figures 1 and 2 are perspective views of the cup and disk respectively.

I claim as new and desire to secure by Letters Patent—

1. In the clutch mechanism, as described, the removable steel shoe inserted within the cavity and upon the bearing-surface of the rollers or equivalent, as and for the purpose set forth.

2. The combination of the cup, disk, rollers, steel shoe, spring, and shaft, substantially as described.

JOHN J. COBURN.

Witnesses:
 JAMES I. ALLISON,
 HUGH B. COYLE.